(12) United States Patent
Hatfield, Jr.

(10) Patent No.: US 6,695,463 B1
(45) Date of Patent: Feb. 24, 2004

(54) VIBRATION ISOLATOR FOR A VEHICLE-MOUNTED LIGHT

(75) Inventor: Lawrence Hatfield, Jr., Butler, KY (US)

(73) Assignee: Let's Roll, Inc., Cincinnati, OH (US)

(*) Notice: Subject to any disclaimer, the term of this patent is extended or adjusted under 35 U.S.C. 154(b) by 4 days.

(21) Appl. No.: 10/231,319

(22) Filed: Aug. 29, 2002

(51) Int. Cl.$^7$ ................................................. F21V 15/04
(52) U.S. Cl. ...................................... 362/390; 362/369
(58) Field of Search ................................ 362/267, 368, 362/369, 389, 390, 396, 455, 505, 549, 546

(56) References Cited

U.S. PATENT DOCUMENTS

| | | | | |
|---|---|---|---|---|
| 2,445,072 A | * | 7/1948 | Lee | ............................ 362/390 |
| 4,617,615 A | * | 10/1986 | Eychaner | ..................... 362/267 |
| 2003/0039118 A1 | * | 2/2003 | Osiecki et al. | ............... 362/390 |

* cited by examiner

Primary Examiner—Y. My Quach-Lee

(57) ABSTRACT

A vehicle-mounted light has a vibration isolator configured to support a reflector within an interior of a light housing. The vibration isolator is formed from a resilient, vibration-absorbing material and includes generally annular front and rear sections spaced apart and interconnected by a generally cylindrical central section. The vibration isolator may be snugly fitted over a radially extending rim of the reflector such that when the reflector and vibration isolator are inserted within the housing, the vibration isolator forms a vibration absorbing interface between the housing and the reflector.

9 Claims, 2 Drawing Sheets

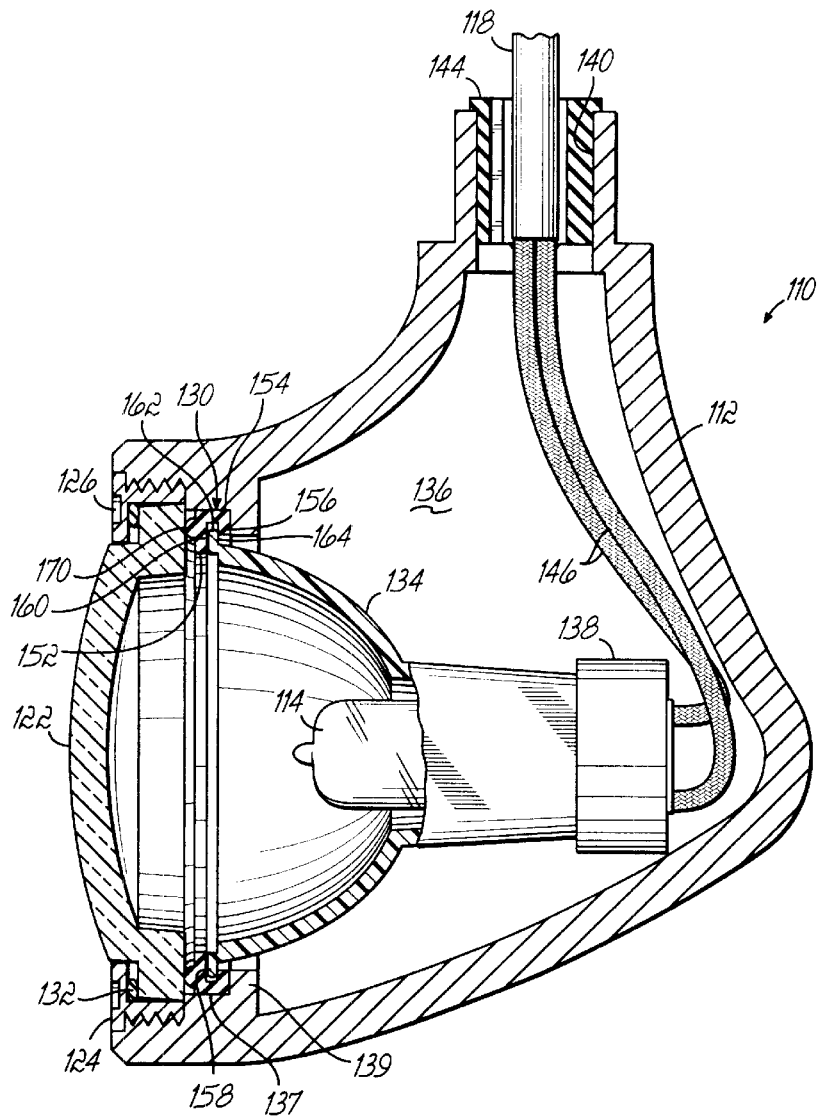
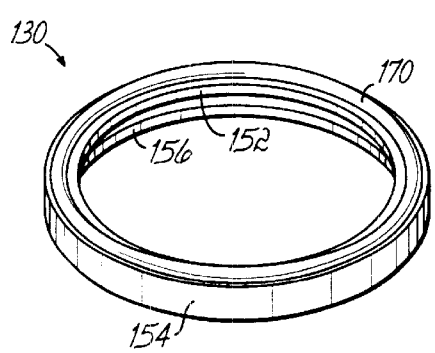
FIG. 4
FIG. 5
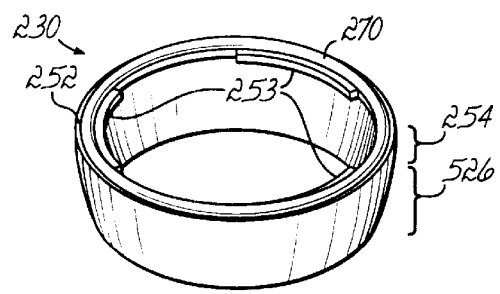
FIG. 6

VIBRATION ISOLATOR FOR A VEHICLE-MOUNTED LIGHT

FIELD OF THE INVENTION

The present invention pertains to vehicle-mounted lights, and more particularly to a vibration isolator for use with vehicle-mounted lights.

BACKGROUND OF THE INVENTION

Lights have been mounted on vehicles such as cars, trucks and motorcycles to enable these vehicles to be operated at night or during periods of decreased visibility, and also to increase the visibility of the vehicles by operators of other vehicles. With particular regard to motorcycles, lights have typically been mounted to engine guards, handlebars, wheel forks, or other structural components of a motorcycle. Such motorcycle-mounted lights typically include a housing which is attached to the motorcycle structure whereby the lights are exposed to various environmental conditions such as moisture from rain and other inclement weather conditions, heat from the sun, and heat which is generated by the engine of the motorcycle. The lights are also subjected to vibration generated both by the vehicle itself and by the road surface over which the vehicle travels. Exposure to these environmental and vibration conditions has a negative effect on the life of bulbs used with vehicle-mounted lights, whereby the operating conditions tend to decrease the life of the bulb, thereby requiring frequent replacement. This is a particular problem for lights of the type incorporating a reflector to which is integrally mounted a light bulb, because the reflector is secured to the housing and vibrations transmitted from the vehicle to the housing are, in turn, directly transmitted to the bulb through the reflector. Aside from the nuisance of having to replace bulbs, since the bulbs is integral with the reflector, the entire bulb/reflector assembly must be replaced, increasing the operating and maintenance costs of the vehicle.

There is thus a need for a means by which a combined bulb and reflector assembly may be mounted in a vehicle-mounted light to protect the bulbs against damage caused by various environmental and vibration conditions and to prolong their service life.

SUMMARY OF THE INVENTION

The present invention provides a vibration isolator which is fabricated of resilient vibration-absorbing material and configured to engage the rim of a reflector located at the forward end thereof, and to function as a vibration-absorbing interface between the reflector and a light housing to which the reflector rim is mounted, thereby isolating the reflector, and in turn, the bulb, from vibrations imparted to the housing by the vehicle on which it is mounted. The vibration isolator also helps to seal the interior of the housing from moisture infiltration when the vibration isolator is compressed between the reflector rim and the periphery of a lens located in front of the reflector and urged against the vibration isolator by a threaded clamping ring which threads into the forward, open end of the housing.

In one aspect of the invention, the vibration isolator has a generally C-shaped cross-section consisting of spaced parallel front and rear annular sections integrally interconnected at their outer edges by a cylindrical central section disposed therebetween. The circular isolator is snugly fitted over the reflector rim, which extends radially outwardly from the forward end of the reflector, such that front and rear annular isolator sections sandwich the reflector rim, with the cylindrical central isolator section snugly encircling the peripheral edge of the reflector rim.

In accordance with a further aspect of the invention, the vibration isolator includes a circular bead extending forwardly from the annular front surface of the front section of the isolator. Preferably the bead has a semi-circular cross-section. The surface of the bead directly contacts the rear surface of the lens periphery at a point slightly inboard of its edge to thereby seal against the lens.

In another aspect of the invention, the vibration isolator has an annual front section and a generally cylindrical central section extending rearwardly from an outer edge of the front section. An integral rear section extends rearwardly of the central section and has a semi-spherical or frusto-parabolic shape configured to engage a correspondingly shaped interior surface of the housing such that the vibration isolator is compressed between the rim of the reflector and the interior surface of the housing when the reflector and vibration isolator are installed within the housing.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 4 is a cross-sectional view of a light having an alternate housing design and showing an alternate embodiment of the vibration isolator of the present invention;

FIG. 5 is a perspective view of the alternate embodiment of the vibration isolator depicted in FIG. 4; and FIG. 6 is a perspective view of another exemplary vibration isolator of the present invention.

DETAILED DESCRIPTION

Figure 1:
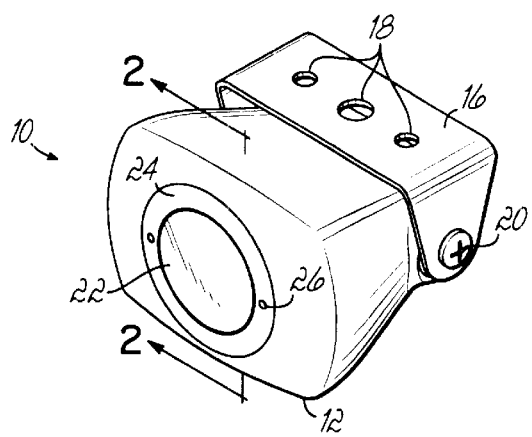
FIG. 1 depicts an exemplary light which is configured to be mounted to a vehicle such as a motorcycle.
Figure 2:
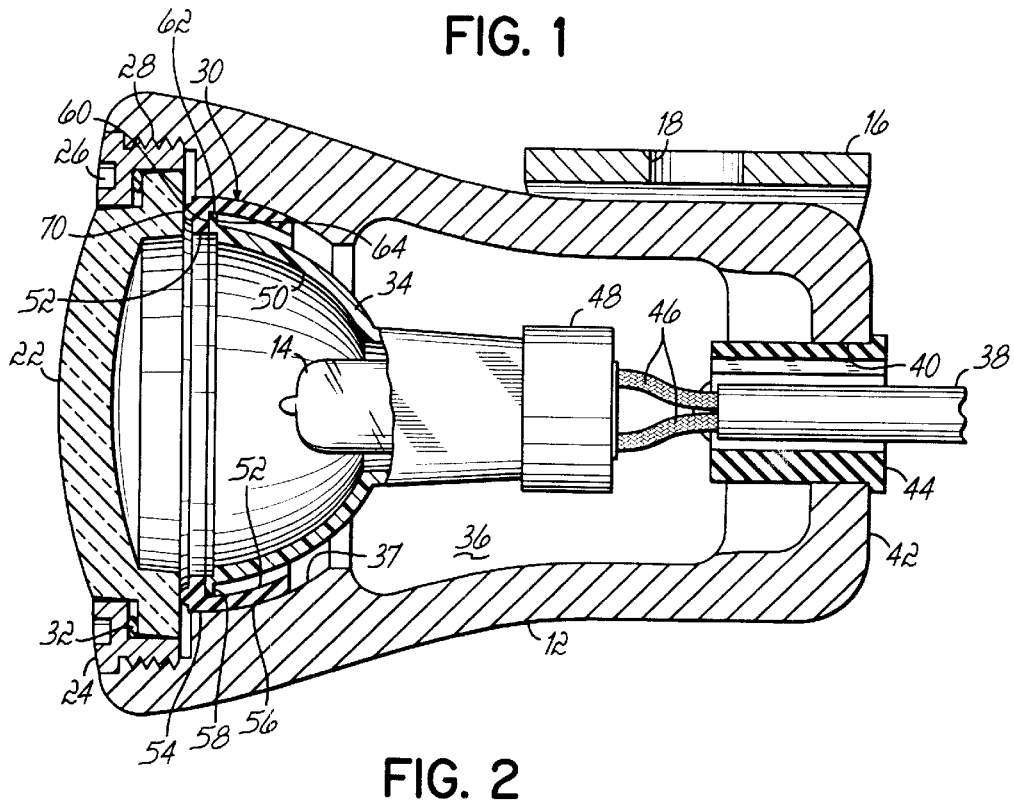
FIG. 2 is a cross-sectional view of the light of FIG. 1 taken along line 2—2 and showing an exemplary vibration isolator of the present invention.

Referring to FIGS. 1–2 there is shown an exemplary light 10 which is configured to be mounted to a vehicle such as a motorcycle. The light 10 includes a generally rectangularly-shaped housing 12 which is adapted to receive a light bulb 14 mounted to a reflector 34 within an interior portion of the housing 12 whereby the bulb 14 may be held in place on the vehicle and protected during operation of the vehicle. The light 10 further includes a bracket 16 which is adapted to mount the light 10 to a structural portion of the vehicle. The bracket 16 may include holes 18 for securing the light 10 to the vehicle and may be attached to the housing 12, for example, by fasteners 20. The light 10 has a lens 22 which covers the bulb 14 and permits light from the bulb 14 to pass through the lens 22 and thereby illuminate an area in front of the light 10.

In the exemplary light 10 shown, the lens 22 is secured to the housing 12 by a retaining ring 24. The retaining ring 24 fits over the lens 22 and has a threaded portion 28 which mates with corresponding threads of the housing 12 whereby the retaining ring 24 may be screwed onto the housing 12, over an opening at a forward end of the housing 12, to capture the light bulb 14 and lens 22 within the housing 12. The retaining ring 24 and lens 22, together, thus form a closure for the housing 12. The retaining ring 24 further includes one or more cylindrically-shaped recesses 26 which may be engaged by the prongs of a spanner bar (not shown) to facilitate threadably securing the retaining ring 24 onto the housing 12. The housing 12 has an interior cavity 36 which is configured to receive the bulb 14 and reflector 34 adjacent an interior surface 37. The light 10 may further be provided with an O-ring 32 between the retaining ring 24 and lens 22 to help seal off the interior cavity 36 against moisture from the outside environment.

A multi-conductor wire 38 may be received through an aperture 40 in an end 42 of the housing 12 opposite the lens 22. The multi-conductor wire 38 is generally secured to the housing 12 by an insulator 44 which further helps to seal the interior of the housing 12 from moisture and serves as a strain relief for the multi-conductor wire 38. Inside the housing 12 individual conductors 46 from the wire 38 are routed to corresponding contacts (not shown) on the bulb 14, generally via an electrical connector 48, to permit illumination of the bulb 14.

While the light 10 depicted in FIG. 1 is a generally rectangular-shaped housing 12 which may be secured to a flat portion of a structural element of a vehicle and has a retaining ring 24 which secures the bulb 14 and lens 22 within the housing 12, those skilled in the art will appreciate that the housing 12 and bracket 16 may have various other forms and that the housing 12 shown is merely intended to depict one possible embodiment.

With continued reference to FIG. 2, there is shown a cross-sectional view of the light 10 of FIG. 1, including an exemplary vibration isolator 30 of the present invention, depicted in cross-section. The bulb 14 will generally be coupled with a reflector 34 configured to support the bulb 14 in a central portion of the housing 12. In the exemplary embodiment shown, bulb 14 is formed integrally with the reflector 34. The reflector 34 has a generally spherical or parabolic shape and an interior surface 50 of the reflector 34 is coated with a reflective material to thereby increase the intensity of the light emitted from the bulb 14 and directed through the lens 22. The reflector further includes an outwardly extending, flanged rim 58. The rim 58 has a forward surface 60 which faces the lens 22 when the reflector 34 is installed in the housing 12, and a peripheral edge 62 which circumscribes the rim 58. A rearward surface 64 is disposed opposite the forward surface 60.

Figure 3:
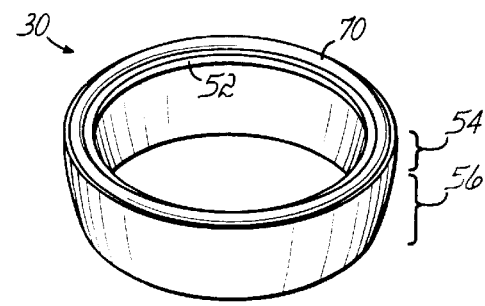
FIG. 3 is a perspective view of the vibration isolator of FIG. 2.

Referring to FIGS. 2–3, vibration isolator 30 includes a front section 52, a central section 54, and a rear section 56 integrally formed together. The front section 52 has a generally annular shape and engages the forward surface 60 of the rim 58. The central section 54 extends rearward from an edge of the front section 52 to engage the peripheral edge 62 of the rim 58. The rear section 56 extends rearwardly from the central section 54 and in a direction inward of the rim 58. In the exemplary embodiment shown in FIGS. 2–3, the rear section 56 has a generally semi-spherical or frusto-parabolic shape which corresponds to the shape of the interior surface 37 of housing 12.

The vibration isolator 30 is formed from a resilient material and may thus be fitted over the rim 58 of the reflector 34 whereafter the reflector 34 and vibration isolator 30 may be inserted through the opening of the housing 12 to engage the interior surface 37 such that the reflector 34 is supported within the housing 12, but is spaced from the interior surface 37 by the vibration isolator 30. When the lens 22 and retaining ring 24 are secured to the housing 12, the lens 22 and retaining ring 24 compress the vibration isolator 30 to capture the reflector 34 within the housing 12. Because the reflector rim 58 is sandwiched between the front 52, central 54, and rear 56 sections of the vibration isolator 30, there is no contact between the reflector 34 and the housing 12 or the closure 22, 24. The reflector 34 and bulb 14 are thereby effectively isolated from vibration transmitted through the housing 12.

The vibration isolator 30 may further include a compression section 70 extending forwardly from the front section 52 and configured to sealingly engage the lens 22 inboard a peripheral edge of the lens as the retaining ring 24 is screwed into the housing 12 to compress the lens 22 against the vibration isolator 30. In the exemplary embodiment, compression section 70 has a semi-circular cross-section. As the retaining ring 24 is screwed into the housing 12, the rim 58 is sandwiched between the front and rear sections 52, 56 of the vibration isolator 30 and is compressed between the lens 22 and the interior surface 37 of the housing 12 to securely capture the reflector 34 within the housing 12 while compression section 70 seals against the lens 22.

Advantageously, the vibration isolator 30 suspends the reflector 34 within the light housing 12 such that no portion of the reflector 34 contacts the housing 12 and compression section 70 helps to prevent moisture infiltration into the housing 12. In the exemplary embodiment, the vibration isolator 30 is formed from a resilient polymeric material and thereby isolates the reflector 34 from vibration transmitted through the light housing 12. The material may also be heat resistant so that it can withstand high temperatures to which the vibration isolator 30 may be exposed during operation of the light. In an exemplary embodiment, the vibration isolator 30 is formed from silicone.

Referring to FIGS. 4 and 5, there is shown another exemplary embodiment of a light 110 and a corresponding vibration isolator 130 according to the present invention, wherein the vibration isolator 130 is configured to be received within an alternative light housing 112 depicted in FIG. 4. In FIGS. 4–5, components corresponding to like components of FIGS. 1–3 are similarly numbered, but have numbers starting in the hundreds. For example, alternate housing 112 of FIG. 4 corresponds to housing 12 of FIGS. 1–2.

The exemplary housing 112 depicted in FIG. 4 has an interior surface 137 including an annular ledge 139 extending radially inward and spaced from an opening of the housing 112 such that the reflector 134 may be received within the housing 112 through the opening and supported by its rim 158 on the annular ledge 139. The vibration isolator 130 is configured to engage the rim 158 of the reflector 134 so that the vibration isolator 130 forms a vibration absorbing interface between the rim 158 and the interior surface 137 of the housing 112, including the annular ledge 139.

The vibration isolator 130 includes a front section 152, a central section 154, and a rear section 156. Similar to the vibration isolator 30 of FIGS. 1–2, the front section 152 has a generally annular shape and engages the forward surface 160 of the rim 158. The central section 154 extends from a side edge of the front section 152 and rearwardly of the front section 152 to engage the peripheral edge 162 of the rim 158.

The rear section 156 extends from the central section 154 in a direction inward of the rim 158 and forms annular shape which is substantially parallel to the front section 152.

When the vibration isolator 130 is fitted over the rim 158 of the reflector 134, the rear section 156 is positioned adjacent the rearward surface 164 of the rim 158 of the reflector 134, whereby the forward and rearward surfaces 160, 164 of the rim 158 are sandwiched against the front and rear sections 152, 156 of the vibration isolator 130 when the reflector 134 and vibration isolator 130 are installed within the housing 112 and secured with the closure 122, 124. Advantageously, the reflector 134 is supported within the housing 112 and is spaced from the interior surface 137 and closure 122, 124 by the vibration isolator 130, whereby vibrations transmitted through the housing 112 are absorbed by the vibration isolator 130 so that they are not transmitted to the reflector 134 and integrally formed bulb 114.

The vibration isolator 130 may further include a compression section 170 extending forwardly from the front section 152 and configured to engage the lens 122 inboard a peripheral edge of the lens 122. In the exemplary embodiment shown, the compression section 170 has an arcuate cross-section and forms a continuous bead around the front section 152 such that the compression section 170 may seal against the lens 122 when the closure 122, 124 is secured to the housing 112.

Light 110 may further be provided with an O-ring 132 between the retaining ring 124 and lens 122 to help seal off the interior cavity 136 against moisture from the outside environment.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. For example, the front section 252 of another exemplary vibration isolator 230 may comprise several segments 253 configured to engage the forward surface of a reflector rim at selected locations around the perimeter of the rim instead of forming a continuos annular shape circumscribing the entire periphery of the rim, as depicted in FIG.6.

The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A vehicle-mounted light, comprising:
   a light housing having an interior cavity defined by an interior surface and a front opening for accessing said interior cavity;
   a closure configured to be secured to said housing proximate said opening, said closure including a lens having an outer peripheral edge and sized to cover at least a portion of said opening, and a retainer adapted to be secured to said housing;
   a reflector insertable into said opening to be removably received within said interior cavity, said reflector having an outwardly extending flanged rim defined by a forward surface, a peripheral edge, and a rearward surface;
   a bulb coupled to said reflector in vibration-receiving relationship therewith; and
   a vibration isolator made from resilient material and snugly engaging said reflector rim, said vibration isolator including:
      a front section circumjacent at least a portion of said forward surface of said rim and having an outwardly facing side edge,
      a central section integral with said front section and extending rearwardly from said side edge of said front section, said central section adjacent and outboard of said peripheral edge of said rim, and
      a rear section integral with said cental section and extending inwardly and rearwardly of said peripheral edge of said rim;
   whereby said reflector may be supported within said interior cavity and spaced from said interior surface and said closure by said vibration isolator to minimize transmission of vibration between said housing and reflector and thereby minimize vibrations imparted to said bulb.

2. The vehicle-mounted light of claim 1, wherein said reflector rim has a generally circular shape and said front section of said vibration isolator has a generally annular shape disposed in confronting relationship to said forward surface of said reflector rim.

3. The vehicle-mounted light of claim 1, wherein said vibration isolator further comprises:
   a compression section extending forwardly from said front section and configured to sealingly engage said lens inboard of said outer peripheral edge of said lens.

4. The vehicle-mounted light of claim 3, wherein said compression section has a generally arcuate semi-circular cross-section and forms a continuous bead around said front section.

5. The vehicle-mounted light of claim 1, wherein said rear section of said vibration isolator has a generally annular shape and is substantially parallel to said front section such that said rear section engages said rearward surface of said rim to sandwich said rim between said front and rear sections when said reflector and said vibration isolator are installed within said housing to engage said interior surface and said closure is secured proximate said opening by said retainer.

6. The vehicle-mounted light of claim 1, wherein said rear section extends arcuately from said peripheral edge of said rim toward a centerline of said reflector, whereby said rim is sandwiched between said front and rear sections when said reflector and vibration isolator are installed within said housing to engage said interior surface and said closure is secured proximate said opening by said retainer.

7. The vehicle mounted light of claim 1, wherein said front section of said vibration isolator comprises a plurality of segments extending around said forward surface of said rim.

8. A vehicle-mounted light, comprising:
   a light housing having an interior cavity defined by an interior surface and a front opening for accessing said interior cavity, said interior surface including a frusto-parabolic portion proximate said opening;
   a closure configured to be secured to said housing proximate said opening, said closure including a lens having an outer peripheral edge and sized to cover at least a portion of said opening, and a retainer adapted to be secured to said housing;
   a reflector insertable into said opening to be removably received within said interior cavity and supported by said frusto-parabolic portion, said reflector having an outwardly extending flanged rim defined by a forward surface, a peripheral edge, and a rearward surface;
   a bulb coupled to said reflector in vibration-receiving relationship therewith; and a vibration isolator made from resilient material and snugly engaging said reflector, said vibration isolator including:
  an annular front section circumjacent said forward surface of said rim and having an outwardly facing side edge,
  a central section integral with said front section and extending rearwardly from said side edge of said front section, said central section adjacent and outboard of said peripheral edge of said rim,
  a rear section integral with said cental section and extending arcuately inwardly and rearwardly of said peripheral edge of said rim, and
  a forwardly extending compression section integral with said front section and forming a continuous bead around said front section, said compression section configured to sealingly engage said lens inboard of said peripheral edge of said lens;
whereby said rim is sandwiched between said front and rear sections of said vibration isolator when said reflector and vibration isolator are installed within said housing to engage said frusto-parabolic portion and said closure is secured proximate said opening by said retainer, to minimize transmission of vibration between said housing and reflector and thereby minimize vibrations imparted to said bulb.

9. A vehicle-mounted light, comprising:

a light housing having an interior cavity defined by an interior surface and a front opening for accessing said interior cavity, said interior surface including an annular ledge spaced rearwardly from said opening;

a closure configured to be secured to said housing proximate said opening, said closure including a lens having a peripheral edge and sized to cover at least a portion of said opening, and a retainer adapted to be secured to said housing;

a reflector having an outwardly extending flanged rim defined by a forward surface, a peripheral edge, and a rearward surface, said reflector insertable into said opening to be removably received within said interior cavity and supported by said annular ledge;

a bulb integrally mounted to said reflector; and a vibration isolator made from resilient material and snugly engaging said reflector, said vibration isolator including:
  an annular front section circumjacent said forward surface of said rim and having an outwardly facing side edge,
  a central section integral with said front section and extending rearwardly from said side edge of said front section, said central section adjacent and outboard of said peripheral edge of said rim,
  an annular rear section integral with said cental section and substantially parallel to said front section such that said rear section is adjacent said rearward surface of said rim, and
  a forwardly extending compression section integral with said front section and forming a continuous bead around said front section, said compression section configured to sealingly engage said lens inboard of said peripheral edge of said lens;
whereby said rim is sandwiched between said front and rear sections when said reflector and vibration isolator are installed within said housing to engage said annular ledge and said closure is secured proximate said opening.

* * * * *

UNITED STATES PATENT AND TRADEMARK OFFICE
CERTIFICATE OF CORRECTION

PATENT NO.     : 6,695,463 B1
DATED          : February 24, 2004
INVENTOR(S)    : Lawrence Hatfield, Jr.

It is certified that error appears in the above-identified patent and that said Letters Patent is hereby corrected as shown below:

Column 1,
Line 36, reads "since the bulbs is integral with" and should read -- since the bulb is integral with --.

Column 5,
Line 40, reads "a continuos annular shape" and should read -- a continuous annular shape --.

Column 6,
Line 8, reads "cental" and should read -- central --.

Column 7,
Line 10, reads "cental" and should read -- central --.

Column 8,
Line 19, reads "cental" and should read -- central --.

Signed and Sealed this

Twenty-first Day of December, 2004

JON W. DUDAS
*Director of the United States Patent and Trademark Office*